United States Patent [19]

Roes

[11] 4,144,548
[45] Mar. 13, 1979

[54] VALIDATOR FOR MAGNETIC TICKETS

[75] Inventor: John B. Roes, San Diego, Calif.

[73] Assignee: Cubic Western Data, San Diego, Calif.

[21] Appl. No.: 876,700

[22] Filed: Feb. 10, 1978

[51] Int. Cl.$^2$ .................. G11B 5/02; G06K 19/06; G06K 21/06; G01D 15/06
[52] U.S. Cl. .................. 360/59; 235/493; 235/495; 346/74.1
[58] Field of Search .................. 360/55, 57, 59, 16; 365/51, 55, 117; 235/495, 493; 346/74.1

[56] References Cited

U.S. PATENT DOCUMENTS

| | | | |
|---|---|---|---|
| 3,171,130 | 2/1965 | Humphreys | 360/55 |
| 3,612,759 | 10/1971 | Nelson et al. | 360/59 |
| 3,731,290 | 5/1973 | Aagard | 360/59 |
| 3,876,860 | 4/1975 | Nomura et al. | 360/16 |

Primary Examiner—Daryl W. Cook
Attorney, Agent, or Firm—Brown & Martin

[57] ABSTRACT

A magnetic ticket validator includes a housing having a ticket receiving channel for receiving a coded magnetic ticket with a heat source adjacent the channel in the form of a flashbulb, with an exposure slot exposing a magnetic strip on the ticket to the flashbulb and a coded masking tape, for imposition of a binary code on the magnetic strip upon initiation of the flashbulb. The heat from the flashbulb heats selected portions of the magnetic tape exposed by the mask.

10 Claims, 5 Drawing Figures

VALIDATOR FOR MAGNETIC TICKETS

BACKGROUND OF THE INVENTION

The present invention relates to ticket handling machines and pertains particularly to a ticket validating machine.

Parking lots in many parts of the country often use credits given by merchants to patrons to collect parking fees from the merchants. This is currently accomplished by stamping the parking ticket at the store. The parking ticket is then processed by a clerk or a bookkeeper for the collection operation.

It is desirable to reduce the personnel involved in operating parking lots and in handling the tickets therefrom. Currently available machines for processing tickets, however, are complicated and expensive. The expense of such machines often make them too expensive to utilize and the complications thereof require costly maintenance.

It is therefore desirable that some automatic and inexpensive ticket validator be available for automatically making a machine readable record on a magnetic tape.

SUMMARY AND OBJECTS OF THE INVENTION

Accordingly, it is the primary object of the present invention to overcome the above problems of the prior art.

Another object of the present invention is to provide a simple and inexpensive machine to provide a machine readable record on a magnetic ticket.

A further object of the present invention is to provide simple, inexpensive and reliable validating machines using a heat source for making a machine readable record on a magnetic tape.

In accordance with the primary aspect of the present invention, a validator for making a readable record on a magnetic tape includes a source of substantially instantaneous heat for applying heat through a coded mask to a magnetic portion of a magnetic tape or ticket.

BRIEF DESCRIPTION OF THE DRAWINGS

The above and other objects and advantages of the present invention will become apparent from the following description when read in conjunction with the drawings, wherein.

DETAILED DESCRIPTION OF THE DRAWING

Figure 1:
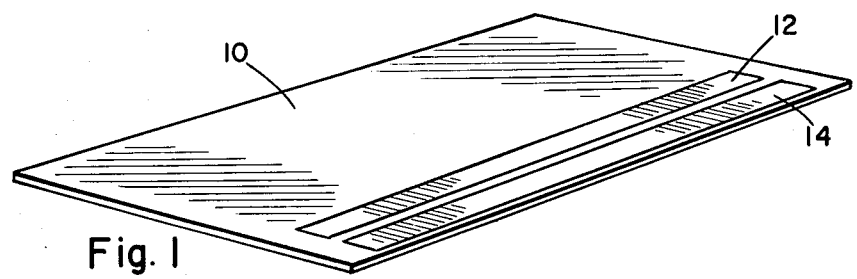
FIG. 1 is a perspective view of a typical ticket.

Turning to FIG. 1 of the drawing, there is illustrated an example of a typical magnetic ticket designated by the numeral 10 and including magnetic coding means in the form of a pair of magnetic strips 12 and 14. Any number of strips may be utilized and the strips may be embedded in the ticket or on the surface thereof as desired. The strips of the ticket, if a parking ticket for a parking lot, for example, may contain one strip or portion such as 12 for merchant validation data and the other strip indicated at 14 for point of issue data. Other information or data may be coded on the ticket as desired.

The principal of the present invention operates on the application of the "Curie point" phenomenon. The Curie point of a magnetic substance is the temperature at which it looses its magnetic susceptibility. For example, a magnetic ticket raised to Curie point temperature will be erased. In substance, a suitable source of heat can be utilized for erasing one or more portions of the record on a ticket.

As an example, chromium dioxide magnetic tape which is commonly used for audio recording has a Curie point of approximately 95° C. Thus, raising the temperature of the chromium dioxide on the tape to this temperature effectively erases the tape. This is a sufficiently low temperature for the present application.

Figure 2:
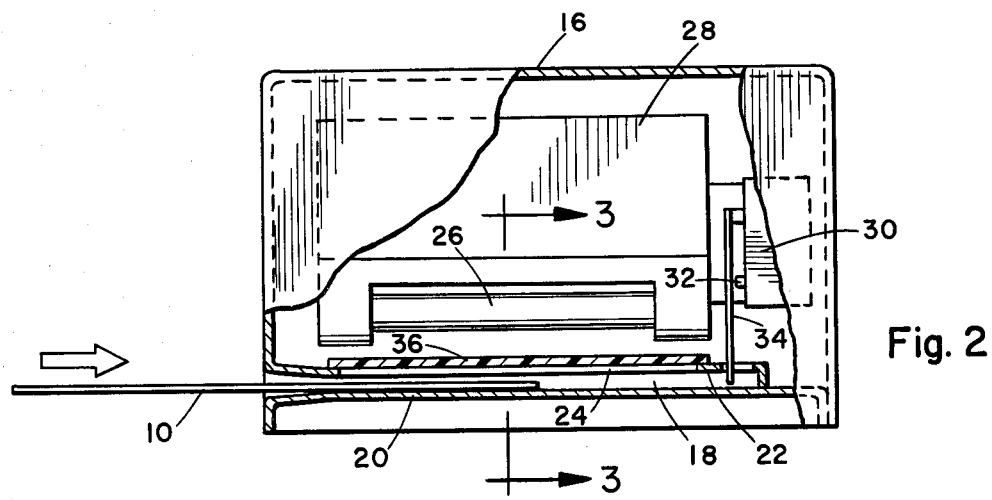
FIG. 2 is a side elevational view, partly cut away, of a machine for printing data on a ticket.
Figure 3:
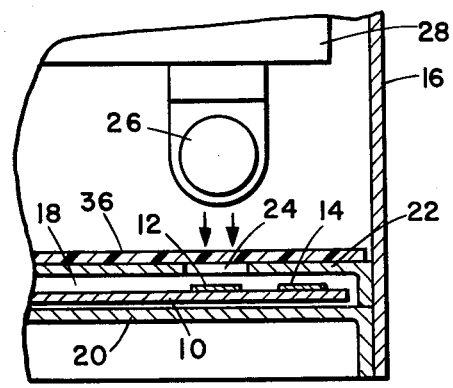
FIG. 3 is an enlarged sectional view taken on line 3—3 of FIG. 2.
Figure 4:
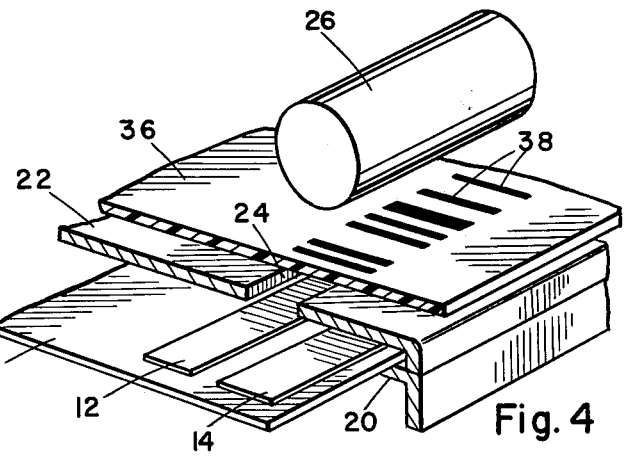
FIG. 4 is a perspective view showing the alignment of the ticket with the printing flash lamp and coded negative.

As best seen in FIGS. 2 through 4 of the drawing, the present invention comprises a housing 16 defining a generally box-like cover having a ticket receiving channel 18 formed between the bottom wall 20 of the housing and an overlapping plate 22. An exposure slot 24 is formed in the plate 22. This structure forms a channel in the housing for receiving a ticket 10. The exposure slot is directly below a suitable source of heat such as a flash bulb or tube 26 of a flash unit 28. The flash unit 28 may be constructed of the same or similar components as those for a typical cameras flash unit The bulb 26, for example, can be xenon bulb, which has been found to have adequate energy for generating an instantaneous heat adequate for the purposes herein described.

The flash unit includes a suitable triggering device including, for example, a micro switch designated at 30 having an actuating button 32 actuated by a lever 34. The lower end of the micro switch lever 34 extends into the ticket channel 18 and is engaged by the inner end of the ticket 10 upon being extended into the channel. Upon engagement of the lever 34 the micro switch 30 is closed, thus activating the flash unit and firing the flash bulb 26. The flash bulb, as seen in FIGS. 3 and 4, is directly above the exposure slot 24. A mask 36 is disposed between the flash bulb 26 and a magnetic strip, such as strip 12 on the ticket 10. The coded mask 36 may be made from a photographic film, for example, and comprise a negative having a plurality of black strips 38 extending across the portion overlying slot 24 for defining a binary code. The black coding strips 38 mask the magnetic strip 12 from the heat source, thus permitting only the portions therebetween on the tape to be erased. Thus, portions of the tape strip 12 are shielded from the heat source such that only the non-shielded portions thereof are erased. This imposes a readable binary code onto the strip of tape.

Figure 5:
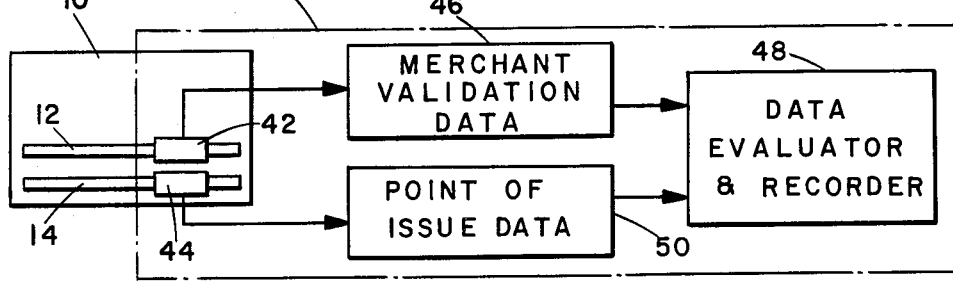
FIG. 5 is a block diagram of the ticket readout apparatus.

In the proposed system, each merchant will have a coded negative 36 identifying his business. When a ticket is inserted in a machine on his premises, the ticket becomes instantaneously coded identifying the user of the ticket as a patron of his store. Upon returning the ticket to the parking attendant, the ticket can be thus easily machine processed and billing dispatched to the merchant. This can be accomplished in a system as block diagrammed in FIG. 5. In this diagram a machine generally designated by the numeral 40 includes magnetic ticket reading heads 42 and 44 for reading the data on the magnetic strips 12 and 14 of the ticket. This data, such as merchant validation data, 46 is transmitted to a suitable data evaluator and recorder 48 which may also include print out machines for billing the customers.

Point of issue data 50 picked up by reading head 44 is also transmitted to the data and evaluator and recorder 48. The data evaluator and recorder, which may be a portion of an existing computer, gives the particular parking lot credit for the charges and bills the merchant for the parking fees.

The system of the present invention and the principals thereof may be applied to any type of tickets, cards or tapes utilizing magnetic data which is to be quickly coded for identification or evaluation. Other variations in the system and apparatus of the present invention are also possible within the scope of the invention as defined in the appended claims.

Having described my invention, I now claim:

1. A validator mechanism for magnetic tickets comprising in combination:
   a housing,
   a channel in said housing for receiving a ticket,
   a source of instantaneous heat disposed adjacent said channel, said source of heat being sufficient to raise the temperature of a magnetic ticket in said channel to the Curie point, and
   masking means for masking selected areas of a ticket in said channel from said heat source for defining a code on said ticket.

2. The validator mechanism of claim 1, wherein said mask includes areas defining a binary code.

3. The validator mechanism of claim 2, wherein said mask is a photo negative.

4. The validator of claim 1, wherein said source of heat is a flash unit.

5. The validator of claim 4, wherein said flash unit includes trigger means positioned in said channel for engagement by a ticket inserted into position in said channel.

6. The validator of claim 5, wherein said flash unit includes a xenon bulb disposed adjacent said channel.

7. The validator of claim 1, wherein said channel includes an exposure slot exposing a selected strip of a ticket disposed adajcent to said heat source, and
   said mask is disposed over said exposure slot.

8. The validator of claim 7, wherein said binary code is defined by multiple exposed strips of a negative.

9. The validator of claim 6, wherein said heat source is a xenon flash bulb disposed adjacent said exposure slot.

10. The validator of claim 9, including trigger means responsive to insertion of a ticket into said slot for activating said flash bulb.

* * * * *